UNITED STATES PATENT OFFICE.

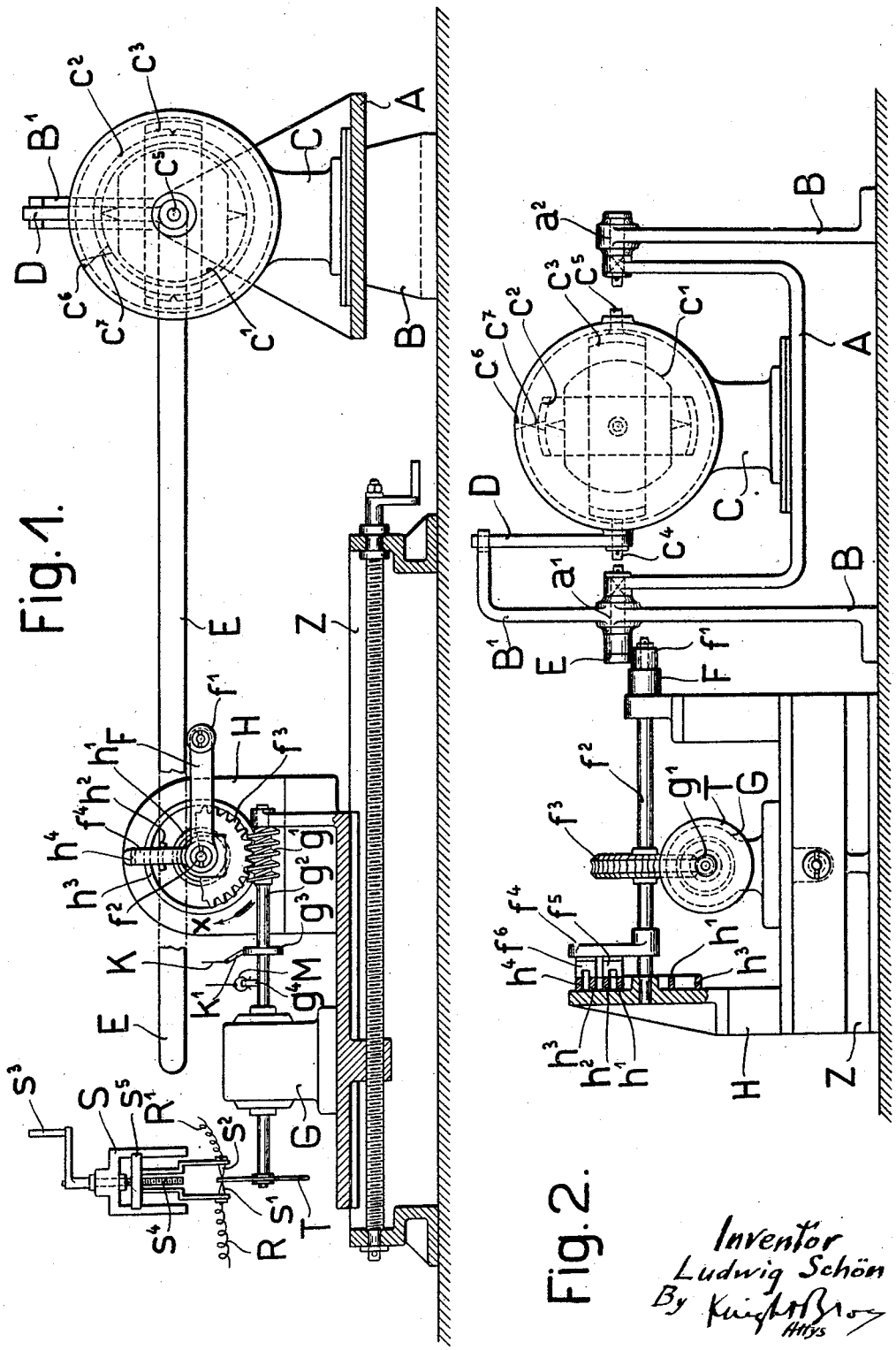

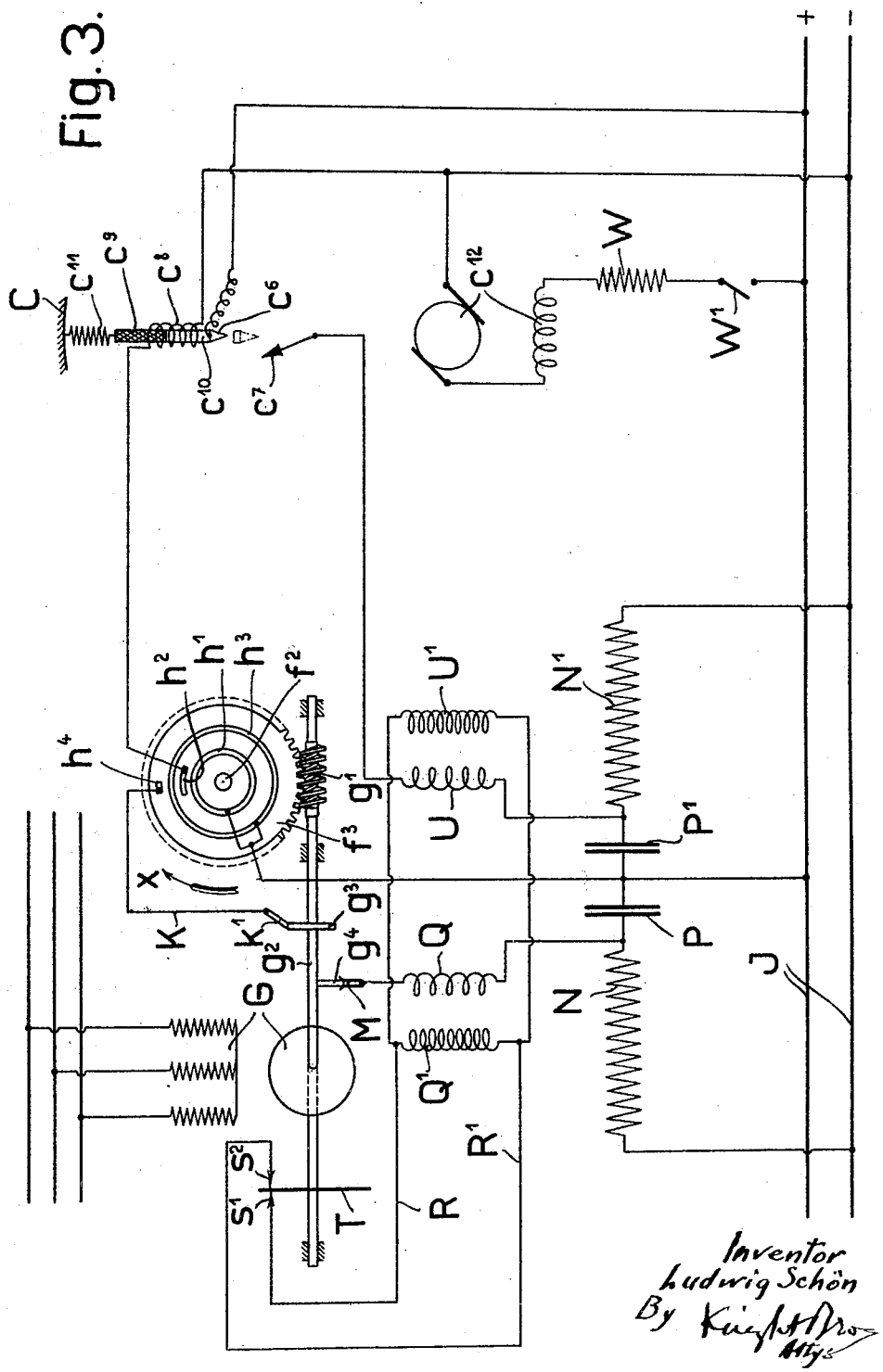

LUDWIG SCHÖN, OF ESSEN, GERMANY, ASSIGNOR TO FRIED. KRUPP AKTIENGESELL-
SCHAFT, OF ESSEN-ON-THE-RUHR, GERMANY.

MEASURING THE SO-CALLED FIRING DELAY FOR NAVAL GUNS.

1,409,788. Specification of Letters Patent. Patented Mar. 14, 1922.

Application filed November 19, 1920. Serial No. 425,103.

*To all whom it may concern:*

Be it known that I, Dr. LUDWIG SCHÖN, residing at Essen, Germany, a citizen of the German Republic, have invented a certain new and useful Improvement in Measuring the So-Called Firing Delay for Naval Guns, (for which I have filed an application in Germany, November 13, 1915,) of which the following is a specification.

This invention relates to apparatus for the measurement of the time corresponding to the so called firing delay in that type of firing apparatus intended for naval guns having two circuit closing devices for closing the firing circuit, and of which one is adjustable with respect to a horizontal axis by means of a gyroscope which is suspended by a Cardan suspension. The object of the invention is to provide an apparatus of the above mentioned type which is distinguished by the fact that the comparatively large number of measurements of time required in order to obtain a mean value can be carried out in rapid succession and with the elimination of errors of observation, and which also possesses the advantage that the recording of the several time marks is effected on a small surface and in a way which permits of a rapid inspection thereof.

The invention will be described with reference to the accompanying drawing which shows diagrammatically a construction of the subject matter of the application.

Figure 1 being a front elevation, partially in section, of the apparatus.

Figure 2, a side elevation of Figure 1, looking from the left and

Figure 3 a diagram of the connections of the several parts of the apparatus.

Referring to Figures 1 and 2, A denotes a swinging table, carried by two pins $a^1$ and $a^2$ in a frame B and is intended for the reception of the firing apparatus C which is to be tested. The firing apparatus C contains a gyroscope $c^1$ which is driven by a continuous current motor ($c^{12}$ see Fig. 3) rotatably mounted in a vertical Cardan ring $c^2$. This Cardan ring $c^2$ is in its turn suspended to rotate in a horizontal Cardan ring $c^3$. The horizontal Cardan ring $c^3$ is mounted to swing by means of pins $c^4$ and $c^5$ in the casing of the firing apparatus C through which they are passed. At the same time the apparatus is so arranged that the axis of the pins $c^4$ and $c^5$ coincides with the axis of oscillation of the pins $a^1$ and $a^2$, that is to say, with the axis of oscillation of the table A. To the pin $c^4$ of the Cardan ring $c^3$ is clamped firmly a rod D, which is connected by its free end to an arm $B^1$ on the frame B, so that the horizontally set Cardan ring $c^3$ cannot move relatively to the frame B when the table A oscillates. On the casing of the gyroscope and on the vertical Cardan ring $c^2$ are mounted the two circuit closing devices $c^6$ and $c^7$, which serve to close the firing circuit and the contact of said circuit closing devices determines the commencement of the period of time to be measured. To the part of the pin $a^1$ which protrudes from the bearing is attached a long rigid lever E, the free end of which bears loosely on one end of a crank arm F having a roller $f^1$ provided for the purpose. The crank arm F, which is mounted on a shaft $f^2$ rotatably mounted in a frame H, is driven from a three phase motor G through a worm gear $g^1 f^3$. On the shaft $f^2$ is provided a second crank $f^4$ which is set at an angle of 90° to the crank F and which carries two forked rubbing contacts $f^5$ and $f^6$, provided for the purpose of closing a circuit temporarily. The corresponding fixed circuit closing devices $h^1$, $h^2$, $h^3$, $h^4$ are of annular shape and are arranged coaxially to the axis of rotation of the crank arm $f^4$, on a part of the frame H, constructed in the form of a disc, so that when the crank arm $f^4$ rotates they can come into contact in pairs with the forked rubbing contacts $f^5$ and $f^6$. Of the circuit closing strips, two $h^1$ and $h^3$ are constructed as complete circles and are intended to be permanently connected say to the positive pole of a source of continuous current (see Figure 3). The two other circuit closing devices $h^2$ and $h^4$ are constructed in the form of short segmental pieces and the arc covered by the circuit closing strip $h^2$ is longer than the arc covered by the circuit closing strip $h^4$, so that when the crank arm $f^4$ rotates in the direction indicated by the arrow $x$ (see Figures 1 and 3) the rubbing contact $f^5$, which rubs upon the circuit closing devices $h^1$ and $h^2$ establishes electrical connection between these circuit closing strips sooner than the rubbing contact $f^6$ does between the circuit closing strips $h^3$ and $h^4$. To the circuit closing strip $h^2$ is connected one end of the winding $c^8$ (see Figure 3) of a magnet $c^9$ which serves to bring the circuit closing tongue $c^6$, normally in a position that it can move past the circuit closing tongue $c^7$ without touching it, into such a position that contact can take place therewith and for this purpose the magnet $c^9$, which is movable in the direction of its length, and to which the circuit closing tongue $c^6$ is rigidly attached by a non-magnetic intermediate piece $c^{10}$, is so suspended from a part of the casing C by a spring $c^{11}$ that it can be drawn into the winding $c^8$ against the action of the spring as soon as the said winding $c^8$ is traversed by a current and magnetized thereby. In consequence of this the circuit closing tongue $c^6$ moves into the position shown by dot and dash lines in the drawing and can only come transitorily into contact with the circuit closing tongue $c^7$ stabilized by the gyroscope, when the table A oscillates. As soon as the winding $c^8$, the other end of which is electrically connected to the negative pole of the source of continuous current is de-energized, the tongue $c^6$ returns under the action of the spring $c^{11}$ into the full line position shown in the drawing.

The length of the circuit closing strip $h^4$ is of such dimensions, that contact takes place with the rubbing contact $f^6$ during one complete revolution of the shaft $g^2$ of the driving motor G.

The circuit closing strip $h^4$ is connected by a conductor K (see Figure 3) with a rubbing brush $k^1$, which bears on a slip ring $g^3$ mounted on the motor shaft $g^2$. From here the current passes through the motor shaft $g^2$ to a finger-like auxiliary contact $g^4$ mounted upon and rotating with the motor shaft $g^2$ and which is at each revolution brought into brief contact with a contact spring M. During this contact there will therefore, when the circuit closing springs $h^3$ and $h^4$ are simultaneously in electrical connection with each other by the rubbing contact $f^6$, be electrical connection between the parts $h^3$, $f^6$, $h^4$, K, $k^1$, $g^3$, $g^2$, $g^4$ and M. A condenser P permanently connected to the source J of continuous current through a resistance N, forms the commencement for the parts of the circuit just mentioned, which in addition to the aforesaid parts also contains the primary winding Q of a sparking coil, the secondary winding $Q^1$ of which is connected through conductors R and $R^1$, with two opposite points $s^1$ and $s^2$. These points $s^1$ and $s^2$ are carried by a cross piece $s^5$ which is mounted to move longitudinally on a carrier S. The cross piece $s^5$ is moved by a crank handle $s^3$ and a screw-threaded spindle $s^4$. As a result of this arrangement of the apparatus, the condenser P can discharge itself once through the primary winding Q at each revolution of the crank arm F, that is to say at each double oscillation of the table A and at the same time produce a current in the secondary winding $Q^1$ which will cause a spark to pass between the two points $s^1$ and $s^2$. The arrangement of the said circuit closing device is so arranged that the instant in which the circuit is closed and therefore the condenser P discharged through the sparking coil Q, $Q^1$ coincides with the instant which determines the end of the period of time to be measured and in which the table A passes through its horizontal position of oscillation.

Between the points $s^1$ and $s^2$ is arranged a disc of strong paper T through which light cannot pass and which is mounted on the shaft $g^2$ of the motor G. This disc is in such a position that it will be perforated when a discharge spark passes between the points $s^1$ and $s^2$.

Parallel with the secondary winding $Q^1$ of the sparking coil Q, $Q^1$ lies the secondary winding $U^1$ of a second sparking coil U, $U^1$ the primary winding U of which is connected, in a manner similar to the primary winding Q, to a condenser $P^1$, which is permanently connected through a resistance $N^1$, to the source J of continuous current. The other end of the primary winding U is electrically connected to the circuit closing tongue $c^7$ on the Cardan ring $c^2$, while the circuit closing tongue $c^6$ mounted on the casing of the firing apparatus, is connected directly to the positive pole of the source of continuous current, J. A discharge of the condenser $P^1$ through the sparking coil U, $U^1$ and the points $s^1$, $s^2$ can therefore take place every time the two circuit closing tongues $c^6$ and $c^7$ come into contact with each other. In order that such contact of the circuit closing tongues $c^6$ and $c^7$ can take place, the magnet $c^8$ must be energized at the instant in which the circuit closing strips $c^6$ and $c^7$ are opposite each other when the table oscillates, by a current which flows during the contact of the rubbing contact $f^5$ with the two circuit closing strips $h^1$, $h^2$, so that the magnet core $c^9$ is drawn into the winding $c^8$ and the tongue $c^6$ moves into the position shown by dot and dash lines.

Both the beginning as well as the end of the period of time to be measured, which lasts from the contact of the two circuit closing tongues $c^6$ and $c^7$ up to the passing of the table A, which carries the firing apparatus C, through the horizontal position of oscillation, will be recorded by a perforation on the paper disc T.

From the diagram of the connections (see Figure 3) it can also be seen that the continuous current motor $c^{12}$ which serves to drive the gyroscope $c^1$ is a series motor connected to the source of current J, through a fixed resistance W and a switch $W^1$.

The three phase motor G, the circuit closing apparatus $f^4$, $f^5$, $f^6$, $h^1$, $h^2$, $h^3$, $h^4$ and the device $s^1$, T $s^2$ for producing the time mark is mounted to move longitudinally on a slide Z in such a way that it can be brought towards or moved away from the table A. By this means it is possible when the frequency of the oscillations of the table A are equal, to vary its velocity of rolling within certain limits, in order to test the influence of this velocity on the indications of the firing apparatus.

The movable mounting of the points $s^1$ and $s^2$ is provided for the purpose of giving to the points $s^1$ and $s^2$ after the passage of each spark a forward movement to a slight extent in a radial direction with respect to the paper disc T.

The apparatus above described operates in the following manner. After the firing apparatus C has been so adjusted on the table A that the axis of rotation of the pins $c^4$ and $c^5$, coincides with the axis of rotation of the pins $a^1$ and $a^2$, and the horizontal Cardan ring $c^3$ has been adjusted accurately in a horizontal plane by means of a spirit level or the like, the ring $c^3$ is fixed in this position relatively to the arm $B^1$ by clamping the rod D fast to the pin $c^4$. By rotating the motor shaft $g^2$ the crank arm F is then brought into such a position that the rubbing contact $f^6$ bears upon the short circuit closing strip $h^4$ and the auxiliary circuit closing device $g^4$ connected up in series with $f^6$, $h^4$ also touches the corresponding circuit closing spring M. The points $s^1$ and $s^2$ are then pushed by means of the hand crank $s^3$ up to the edge of the disc T. The gyroscope $c^1$ is next set going by closing the switch $W^1$ and the three phase motor G, is started. As the motor G revolves, the table A oscillates, the law of which oscillations is determined by the gearing $g^2$, $g^1$, $f^3$, $f^2$, F, $f^1$, E, $a^1$ and the oscillations of the table A which are uniform after the number of revolutions of the motor G have become constant, are taken part in by the casing of the firing apparatus which carries the circuit closing tongue $c^6$, whereas the Cardan ring $c^2$ which is acted on by the gyroscope $c^1$ and carries the circuit closing tongue $c^7$ does not alter its position relatively to the fixed parts. At each revolution of the crank arm F two spark discharges take place through the paper disc T one in consequence of the contact of the contact tongues $c^6$ and $c^7$ of the firing apparatus C, while the rubbing contact $f^5$ establishes electrical connection between the circuit closing strips $h^1$ and $h^2$, and the other at the instant of the simultaneous contact of the circuit closing devices $f^6$, $h^4$ and $g^4$, M. The paper disc T is advanced by a small fixed amount in a radial direction after each complete revolution of the crank arm F by suitably rotating the crank handle $s^3$. The said spark discharges produce in the disc T small holes, of which every two holes lying on the same circle determine the corresponding instant of a contact of the circuit closing tongues $c^6$, $c^7$ and the passage of the table A through the horizontal position of oscillation which follows. As the holes which are formed when the table A passes through the horizontal position of oscillation and which determine the end of the period of time which is to be measured, lie accurately on a radius of the disc owing to the positive connection of the parts concerned, the holes which are produced on the contact of the circuit closing tongues $c^6$ and $c^7$ and which determine the beginning of the period of time to be measured however are found, owing to slight fluctuations in the closing of the circuit at the circuit closing tongues $c^6$ and $c^7$ which cannot be avoided, strewn at irregular intervals around a mean radius, the position of which indicates the mean value of the particular measurements. The angular distance of this mean radius from the radius first mentioned is a measure for the period of time lying between the points of time of each two successive spark discharges and therefore also for the duration of the so-called advanced ignition, that is to say, the average time which has elapsed between the contact of the circuit closing tongues $c^6$, $c^7$ and the passage of the table A through the horizontal position of oscillation. To find the desired time values it is only necessary to divide the angles enclosed by the two radii by the known angular velocity of the paper disc T.

A special advantage of the apparatus described consists in the method of connection of the condensers P and $P^1$. As they are permanently connected to the source J of the continuous current, they are recharged after each discharge through the resistances N and $N^1$ placed in advance of them so that at each discharge the full amount of electricity which is proportional to the capacity of the condensers and the tension of the source of the continuous current is available for the spark discharges.

As the marks received on the paper disc T are very permanent and at the same time allow light to pass through them while the disc T is conveniently made of a paper which does not allow light to pass through it, a large number of prints may if so desired be obtained of the results of the measurements secured, such prints being produced by photochemical means.

If the recording of the time marks is to take place on the basis of different velocities of roll, it is only necessary to shift the motor G with the contact apparatus H and the paper disc T and also the points $s^1$ and $s^2$ a certain distance along the slide Z longitudinally of the lever E. The rolling movements then take place with the same frequency as before, but with a different amplitude and therefore also at a different speed when the table A passes through the horizontal rolling position. In this way it can be determined what influence the magnitude of the speed of rolling has on the duration of the period of time which is to be measured.

Claims.

1. An apparatus of the class described for measuring the time corresponding to the so-called firing delay in firing apparatus for naval guns, comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting a periodic oscillation to said table, a recording apparatus embodying a disc and a pair of sparking points, a circuit including sparking coils for electrically connecting the sparking points to the circuit closing devices of the firing apparatus, contact of said circuit closing devices causing said recording means to function and means operatable by the table oscillating means and included in said circuit for causing the sparking points to function when the table passes through its horizontal position.

2. An apparatus of the class described for measuring the time corresponding to the so-called firing delay in firing apparatus for naval guns, comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, a constantly driven motor, a crank arm rotated by said motor, a lever projecting from said table and engaging said crank arm for imparting to said table a periodic oscillation, a recording apparatus embodying a disc and a pair of sparking points, a circuit including sparking coils for electrically connecting the sparking points of the circuit closing devices of the firing apparatus, contact of said circuit closing devices causing said recording means to function and means operatable by the table oscillating means included in said circuit for causing the sparking points to function when the table passes through its horizontal position.

3. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting a periodic oscillation to said table, a recording apparatus comprising a disc connected to and rotated by the table oscillating means, a pair of sparking points disposed on either side of said disc, said sparking points lying in the secondary circuit of a sparking coil, a contact apparatus electrically connected to said sparking points and adapted to close the primary circuit of said sparking coil when the table passes through its horizontal position of oscillation.

4. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting a periodic oscillation to said table, a recording apparatus comprising a disc connected to and rotated by the table oscillating means, a pair of sparking points disposed on either side of said disc, said sparking points lying in the secondary circuit of a sparking coil, a contact apparatus electrically connected to said sparking points and adapted to close the primary circuit of said sparking coil when the table passes through its horizontal position of oscillation, said contact apparatus embodying two points at which the circuit is closed, said points being disposed one behind the other, the circuit remaining closed momentarily only at one of said points.

5. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting periodic oscillation to said table, a recording apparatus comprising a disc, a pair of sparking points disposed on either side of said disc, a sparking coil provided with a primary and secondary winding, the secondary winding of which is in circuit with said sparking points, a second sparking coil provided with a primary and secondary winding, the primary winding of said second sparking coil being connected in circuit with said circuit closing devices, the secondary winding of said second sparking coil being connected up in parallel with the secondary winding of said first mentioned sparking coil and a contact apparatus electrically connected to said sparking coils and adapted to close the primary circuit of said first mentioned sparking coil when the table passes through its horizontal position of oscillation.

6. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting a periodic oscillation to said table, a recording apparatus embodying a disc and a pair of sparking points, means for mounting said sparking points to allow radial adjustment of the same relative to said disc, a circuit including sparking coils for electrically connecting the sparking points to the circuit closing devices of the firing apparatus, contact of said circuit closing devices causing said recording means to function and means operatable by the table oscillating means included in said circuit for causing the sparking points to function when the table passes through its horizontal position.

7. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, means for imparting periodic oscillation to said table, a recording apparatus comprising a disc, a pair of sparking points disposed on either side of said disc, a sparking coil provided with a primary and secondary winding, the secondary winding of which is in circuit with said sparking points, a second sparking coil provided with a primary and secondary winding, the primary winding of said second sparking coil being connected in circuit with said circuit closing devices, the secondary winding of said second sparking coil being connected up in parallel with the secondary winding of said first mentioned sparking coil and a contact apparatus electrically connected to said sparking coils and adapted to close the primary circuit of said first mentioned sparking coil when the table passes through its horizontal position of oscillation, a condenser electrically connected with the primary winding of each of said sparking coils and a resistance interposed between each condenser and a source of continuous current to which each condenser is connected.

8. An apparatus of the class described for measuring the time corresponding to the so-called firing delay in firing apparatus for naval guns comprising a firing apparatus embodying a casing carrying one circuit closing device and a gyroscopic apparatus suspended by a Cardan suspension carrying a second circuit closing device, a swinging table upon which said firing apparatus is supported, the axis of oscillation of which coincides with the axis of oscillation of one Cardan ring of the Cardan suspension, means for securing said Cardan ring in a horizontal position, a constantly driven motor, a change speed gear interposed between said motor and said table whereby the law of oscillation which determines the movement of said table may be changed while the number of revolutions of said motor remains constant, a recording apparatus embodying a disc and a pair of sparking points, a circuit including sparking coils for electrically connecting the sparking points to the circuit closing devices of the firing apparatus, contact of said circuit closing devices causing said recording means to function and means operatable by the table oscillating means included in said circuit for causing the sparking points to function when the table passes through its horizontal position.

9. An arrangement of the class described comprising the combination with a firing apparatus provided with two circuit-closing devices, of which one is controlled by a gyroscope of a swinging table for carrying the firing apparatus, means for oscillating said table, a recording apparatus, a circuit including said circuit-closing device and said recording apparatus and embodying means for operating the recording apparatus when the table passes through its horizontal position.

10. An arrangement of the class described comprising the combination with a swinging table adapted to support a firing apparatus for naval guns, which firing apparatus is provided with two circuit-closing devices for closing the firing circuit, of means for oscillating said table, a recording apparatus, an additional circuit-closing device operating with the table oscillating means, an electric circuit including the first mentioned circuit-closing devices, the recording apparatus and the additional circuit-closing devices whereby the contact of the first mentioned circuit closing-devices may be indicated by the recording apparatus and the time at which the table passes through its horizontal position subsequently indicated by the recording apparatus.

11. An apparatus for the measurement of time corresponding to the so-called firing delay in firing-apparatus for naval guns which comprises in combination with a firing apparatus embodying two circuit-closing devices for closing the firing circuit, one of which is stabilized by a gyroscope, a swinging table for supporting the firing apparatus, means for imparting a periodic oscillation to the table, a recording apparatus comprising a rotating disc with a pair of radially movable sparking points, a circuit including sparking coils for electrically connecting the sparking points to the circuit closing devices of the firing apparatus and means operable by the table oscillating means and included in said circuit for causing the sparking points to function when the table passes through its horizontal position.

The foregoing specification signed at Essen, Germany, this 28th day of June, 1920.

LUDWIG SCHÖN.

In presence of—
HANS GOTTSMANN,
CARL MÜLLER.